US009518857B2

(12) United States Patent
Edvardsson et al.

(10) Patent No.: US 9,518,857 B2
(45) Date of Patent: Dec. 13, 2016

(54) SINGLE CONDUCTOR PROBE RADAR LEVEL GAUGE SYSTEM AND TANK ARRANGEMENT

(71) Applicant: Rosemount Tank Radar AB, Gothenburg (SE)

(72) Inventors: Olov Edvardsson, Linkoping (SE); Lars Ove Larsson, Linkoping (SE); Christer Joshua Frovik, Linkoping (SE); Mikael Eriksson, Vastervik (SE)

(73) Assignee: ROSEMOUNT TANK RADAR AB, Gothenburg (SE)

( * ) Notice: Subject to any disclaimer, the term of this patent is extended or adjusted under 35 U.S.C. 154(b) by 192 days.

(21) Appl. No.: 14/319,122

(22) Filed: Jun. 30, 2014

(65) Prior Publication Data
US 2015/0377680 A1 Dec. 31, 2015

(51) Int. Cl.
*G01F 1/58* (2006.01)
*G01F 23/284* (2006.01)
(Continued)

(52) U.S. Cl.
CPC ............. *G01F 23/284* (2013.01); *G01S 7/292* (2013.01); *G01S 13/88* (2013.01); *H01Q 1/225* (2013.01)

(58) Field of Classification Search
CPC ............ G01F 1/662; G01F 1/667; G01F 1/66; G01F 1/58; G01F 1/586; G01F 23/284; G01F 1/00; G01S 13/88; G08B 19/005; G01N 21/84
(Continued)

(56) References Cited

U.S. PATENT DOCUMENTS 5,872,494 A 2/1999 Palan et al.
5,877,663 A 3/1999 Palan et al.
(Continued)

FOREIGN PATENT DOCUMENTS

EP 2 490 040 A1 8/2012
WO WO 2013/004313 1/2013

OTHER PUBLICATIONS

Notification of Transmittal of the International Search Report and the Written Opinion of the International Searching Authority from PCT/EP2015/064537, dated Sep. 14, 2015.

*Primary Examiner* — Eric S McCall
*Assistant Examiner* — Mohammed E Keramet-Amircolai
(74) *Attorney, Agent, or Firm* — Westman, Champlin & Koehler, P.A.

(57) ABSTRACT

A radar level gauge system comprising a single conductor probe extending through a tubular mounting structure towards and into the product in the tank, a shielding structure radially spaced apart from the single conductor probe and extending along a top portion of the probe inside the mounting structure and past the lower end of the mounting structure, and processing circuitry connected to the transceiver for determining the filling level of the product in the tank. The shielding structure at least partly encloses the top portion of the single conductor probe, and is open in a radial direction to allow entry of the product. The shielding structure exhibits a total enclosing arc angle around the single conductor probe greater than 180° inside the tubular mounting structure, and a total enclosing arc angle around the single conductor probe that decreases with increasing distance from the lower end of the mounting structure.

19 Claims, 6 Drawing Sheets

(51) Int. Cl.
*G01S 7/292* (2006.01)
*G01S 13/88* (2006.01)
*H01Q 1/22* (2006.01)

(58) Field of Classification Search
USPC .................................. 73/861.11, 861.28, 735
See application file for complete search history.

(56) References Cited

U.S. PATENT DOCUMENTS

| | | | |
|---|---|---|---|
| 6,690,320 B2 | 2/2004 | Benway et al. | |
| 7,525,476 B1* | 4/2009 | Delin | G01S 7/4056 324/600 |
| 7,636,059 B1* | 12/2009 | Edvardsson | G01F 23/284 342/124 |
| 2004/0080324 A1* | 4/2004 | Westerling | G01F 23/284 324/644 |
| 2004/0108951 A1* | 6/2004 | Edvardsson | G01F 23/284 342/124 |
| 2004/0119636 A1* | 6/2004 | Edvardsson | G01F 23/284 342/124 |
| 2005/0083228 A1* | 4/2005 | Edvardsson | G01S 7/03 342/124 |
| 2006/0109010 A1* | 5/2006 | Edvardsson | H01Q 1/225 324/644 |
| 2007/0090992 A1* | 4/2007 | Edvardsson | G01F 23/284 342/124 |
| 2008/0100501 A1* | 5/2008 | Edvardsson | G01F 15/12 342/124 |
| 2009/0085794 A1* | 4/2009 | Edvardsson | G01F 23/284 342/124 |
| 2012/0007768 A1 | 1/2012 | Hemmendorff | |
| 2012/0169527 A1* | 7/2012 | Edvardsson | G01F 23/284 342/124 |
| 2012/0169528 A1* | 7/2012 | Edvardsson | G01F 23/284 342/124 |
| 2012/0319891 A1* | 12/2012 | Edvardsson | H01Q 1/225 342/124 |
| 2013/0009803 A1* | 1/2013 | Edvardsson | G01F 23/284 342/124 |
| 2013/0076559 A1* | 3/2013 | Edvardsson | G01S 13/36 342/124 |
| 2014/0083183 A1* | 3/2014 | Edvardsson | G01F 23/00 73/290 V |
| 2014/0084945 A1* | 3/2014 | Edvardsson | G01F 23/284 324/644 |

* cited by examiner

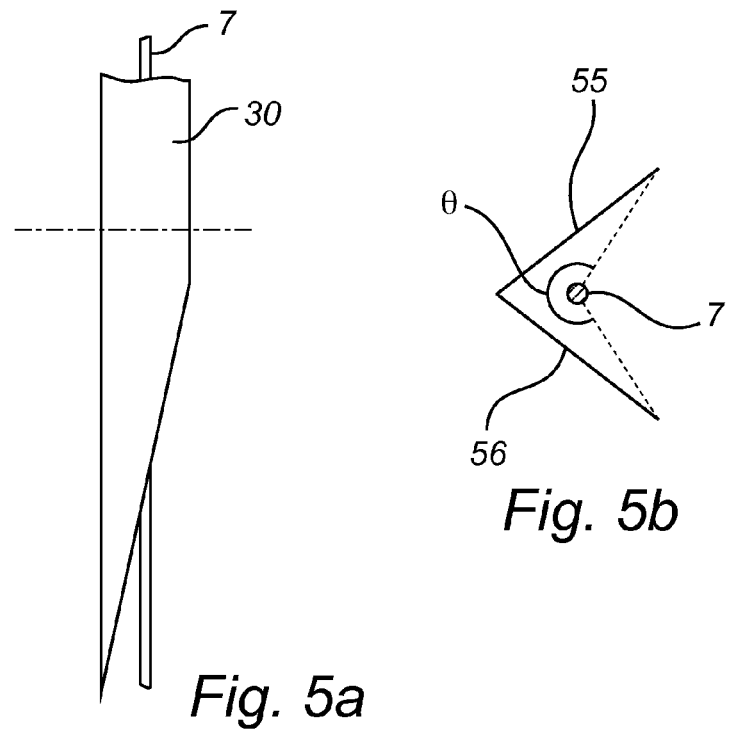
Fig. 5a
Fig. 5b
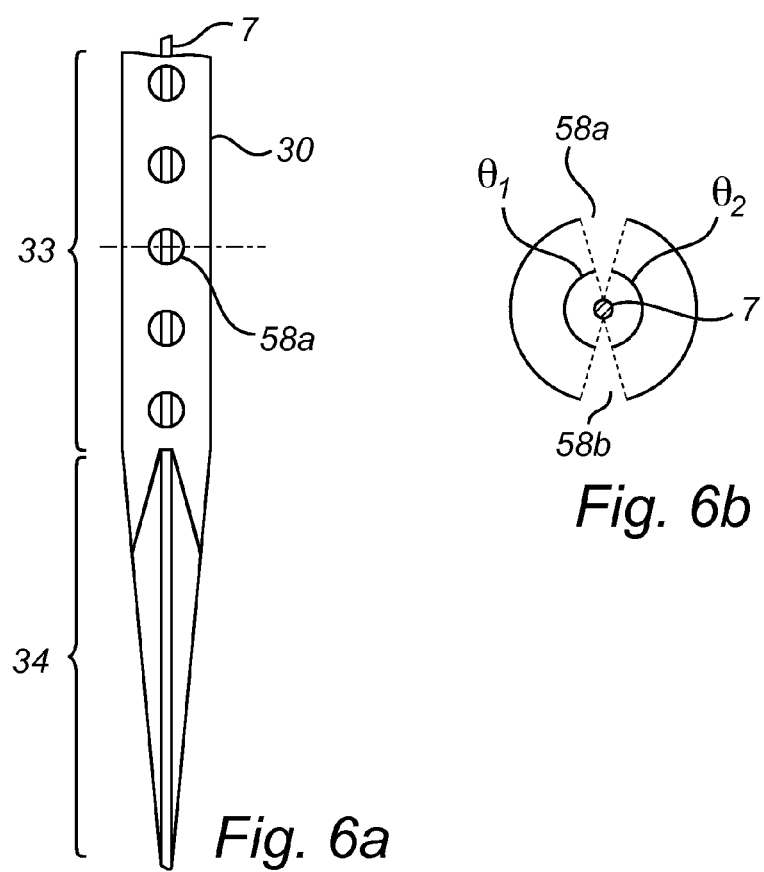
Fig. 6a
Fig. 6b

SINGLE CONDUCTOR PROBE RADAR LEVEL GAUGE SYSTEM AND TANK ARRANGEMENT

TECHNICAL FIELD OF THE INVENTION

The present invention relates to a radar level gauge system comprising a single conductor probe, and to a tank arrangement comprising a tank having a tubular mounting structure and a radar level gauge system attached to the tubular mounting structure in such a way that the single conductor probe passes through the tubular mounting structure.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a transmission line probe acting as a waveguide. The probe is generally arranged to extend vertically from the top towards the bottom of the tank.

An electromagnetic transmit signal is generated by a transceiver and propagated by the probe towards the surface of the product in the tank, and an electromagnetic reflection signal resulting from reflection of the transmit signal at the surface is propagated back towards to the transceiver.

Based on the transmit signal and the reflection signal, the distance to the surface of the product can be determined.

The transmit signal is typically not only reflected at the impedance transition constituted by the interface between the tank atmosphere and the surface of the product, but at several other impedance transitions encountered by the transmit signal. In the case of a GWR-system, one such impedance transition typically occurs at the connection between the transceiver and the probe. Generally, the transceiver is located outside the tank, and is connected to the probe via a feed-through going through a wall (typically the roof) of the tank.

Such a feed-through is typically formed by a coaxial line having the probe as its inner conductor, the tank wall or a connection piece that is attached to the tank as its outer conductor, and a dielectric member provided between the inner and outer conductors.

Due to the combined need for a sufficiently mechanically strong inner conductor and a practical outer conductor diameter, a feed-through impedance much above about 50Ω is seldom feasible. Hence, because of its structure, the impedance of the feed-through is generally similar to that of a typical coaxial cable, that is, about 50Ω.

A radar level gauge system is often mounted on a tubular mounting structure extending substantially vertically upwards from a roof of the tank. Such a mounting structure, which is often referred to as a "nozzle" may be a pipe that is welded to the tank and fitted with a flange at its upper end to allow attachment of an instrument, such as a radar level gauge system, or a blind flange. The inner diameter of the tubular mounting structure may typically be between 0.1 and 0.2 m, and a typical length may be around 0.5 m. In a tank arrangement comprising a tubular mounting structure (nozzle), the probe is typically mechanically connected to the tank at an upper end of the mounting structure, and passes through the mounting structure, past a lower end of the mounting structure, before entering the tank itself. At the upper end of the mounting structure, the probe may be electrically connected to the transceiver of the radar level gauge system through a feed-through that passes through the tank boundary.

For single conductor probes, sometimes also referred to as Goubau-probes, it has been found that propagation of the electromagnetic signal that is guided by the probe is affected by the tubular mounting structure, especially when the tubular mounting structure is relatively narrow and high.

Rather than having the properties of a surface waveguide, the single conductor probe inside the tubular mounting structure in effect acts like a coaxial transmission line with signal propagation properties depending on the dimensions of the tubular mounting structure. In particular, the impedance of the transmission line inside the tubular mounting structure may be in the order of 150Ω and may vary between installations. Accordingly, there will be a first impedance step at the interface between the feed-through and inside the tubular mounting structure and a second impedance step at the lower end of the tubular mounting structure.

The relatively large impedance step (about 150Ω to about 370Ω) at the lower end of the tubular mounting structure may disturb measurements of filling levels close to the lower end of the tubular mounting structure. In fact, the mismatch echo resulting from the above-mentioned impedance step may be stronger than the echo from an oil surface. In addition, multiple reflections between the impedance transition at the feed-through and the impedance transition at the lower end of the tubular mounting structure might lead to additional echo signals, which may disturb the filling level measurement relatively far below the lower end of the tubular mounting structure.

According to U.S. Pat. No. 6,690,320, problems caused by the reflection at the end of a tubular mounting structure are addressed by providing a coaxial cable extension inside the tubular mounting structure until after the probe exits the tubular mounting structure, so that the probe with the coaxial extension has the same impedance as the feed line between the transceiver and the probe (about 50Ω)). With this configuration, there is in effect no single conductor probe inside the tubular mounting structure, but the single conductor probe starts below the lower end of the tubular mounting structure, where the coaxial extension ends. As a result, there will be only one large impedance step, but since this impedance step is located below the lower end of the tubular mounting structure, the zone at the top of the tank where reliable filling level measurements cannot be performed (the so-called deadzone) will start at the end of the coaxial extension (below the tubular mounting structure), and will still be significant. Furthermore, there will be a significant loss of signal due to the strong reflection at the end of the coaxial extension, which limits the maximum measurable distance. Some signal will also find its way up in the tubular mounting structure (nozzle) and further disturb the echo situation.

To improve the above-described situation, EP 2 490 040 discloses a radar level gauge system comprising a single conductor probe and an impedance matching arrangement provided to the probe and extending along a portion of the probe. The impedance matching arrangement has a radial extension that may be constant or changing with a first rate of change inside the tubular mounting structure, and changes with increasing distance from the lower end of the tubular mounting structure with a second negative rate of change. The impedance matching arrangement (dielectric sleeve)

decreases the impedance and locally reduces the radial extension of the electromagnetic field resulting from the transmitted electromagnetic signal within the tubular mounting structure, and then provides for a gradual change of the impedance from the impedance inside the tubular mounting structure to the impedance of the probe in the tank itself, below the lower end of the tubular mounting structure.

Although the solution according to EP 2 490 040 provides for an improvement in the determination of filling levels close to the tank ceiling and allows for measurement of filling levels in at least the lower part of the tubular mounting structure (nozzle), it would be desirable to provide for improved measurement of filling levels higher up in the nozzle.

SUMMARY OF THE INVENTION

In view of the above, a general object of the present invention is to provide for an improved radar level gauge system and tank arrangement, in particular providing for improved measurement of filling levels inside a tubular mounting structure at the top of the tank, using a single conductor probe extending through the tubular mounting structure.

According to a first aspect of the present invention, these and other objects are achieved through a radar level gauge system for determining a filling level of a product in a tank having a tubular mounting structure extending substantially vertically upwards from a roof of the tank, the radar level gauge system comprising a transceiver arranged outside the tank for generating, transmitting and receiving electromagnetic signals; a single conductor probe arranged inside the tank and electrically connected to the transceiver via a feed-through arranged at an upper end of the mounting structure, the single conductor probe extending substantially vertically through the mounting structure past a lower end of the mounting structure towards and into the product in the tank for guiding an electromagnetic transmit signal from the transceiver through a tank atmosphere towards a surface of the product, and for returning an electromagnetic surface reflection signal resulting from reflection of the transmit signal at the surface back towards the transceiver; an electrically conductive shielding structure radially spaced apart from the single conductor probe and extending along a top portion of the single conductor probe inside the mounting structure and past the lower end of the mounting structure; and processing circuitry connected to the transceiver for determining the filling level based on the transmit signal and the surface reflection signal, wherein the shielding structure at least partly encloses the top portion of the single conductor probe, and is open in a radial direction to allow entry of the product, thereby enabling measurement of filling levels corresponding to the top portion of the probe, the shielding structure comprising a first portion extending along the single conductor probe inside the mounting structure, and a second portion extending along the single conductor probe below the lower end of the mounting structure, wherein the shielding structure exhibits, in a cross-section perpendicular to an extension of the single conductor probe: a total enclosing arc angle around the single conductor probe greater than 180° in the first portion; and a total enclosing arc angle around the single conductor probe that decreases with increasing distance from the lower end of the mounting structure in the second portion.

According to a second aspect of the present invention, the above-mentioned and other objects are achieved through a tank arrangement comprising: a tank having a tubular mounting structure extending substantially vertically upwards from a roof of the tank, the tank containing a product to be gauged; and a radar level gauge system for determining a filling level of the product contained in the tank, the radar level gauge system comprising: a transceiver arranged outside the tank for generating, transmitting and receiving electromagnetic signals; a single conductor probe arranged inside the tank and electrically connected to the transceiver via a feed-through arranged at an upper end of the mounting structure, the single conductor probe extending substantially vertically through the mounting structure past a lower end of the mounting structure towards and into the product in the tank for guiding an electromagnetic transmit signal from the transceiver through a tank atmosphere towards a surface of the product, and for returning an electromagnetic surface reflection signal resulting from reflection of the transmit signal at the surface back towards the transceiver; an electrically conductive shielding structure radially spaced apart from the single conductor probe and extending along a top portion of the single conductor probe inside the mounting structure and past the lower end of the mounting structure; and processing circuitry connected to the transceiver for determining the filling level based on the transmit signal and the surface reflection signal, wherein the shielding structure at least partly encloses the top portion of the single conductor probe, and is open in a radial direction to allow entry of the product, thereby enabling measurement of filling levels corresponding to the top portion of the probe, the shielding structure comprising a first portion extending along the single conductor probe inside the mounting structure, and a second portion extending along the single conductor probe below the lower end of the mounting structure, wherein the shielding structure exhibits, in a cross-section perpendicular to an extension of the single conductor probe: a total enclosing arc angle around the single conductor probe greater than 180° in the first portion; and a total enclosing arc angle around the single conductor probe that decreases with increasing distance from the lower end of the mounting structure in the second portion.

That the shielding structure is open in a radial direction to allow entry of the product, provides for the product to come sufficiently close to the single conductor probe that the impedance transition at the surface of the product results in a measurable echo signal even when the surface is higher than the lower end of the shielding structure. For example, the space between the single conductor probe and the inner wall of the shielding structure may be substantially empty, or may be partly filled with a dielectric, as long as the product can come sufficiently close to the single conductor probe.

The tank may be any container or vessel capable of containing a product.

The "transceiver" may be one functional unit capable of transmitting and receiving electromagnetic signals, or may be a system comprising separate transmitter and receiver units.

The single conductor probe may be essentially rigid or flexible and may be made from metal, such as stainless steel.

When the radar level gauge system is arranged in such a way that the probe passes through the tubular mounting structure (nozzle) of a tank, the probe will be within the tank inside the tubular mounting structure as well as below the tubular mounting structure, but inside the tubular mounting structure, the distance from the probe to the (conductive) wall of the tubular mounting structure will be considerably shorter than the distance between the probe and the tank wall below the lower end of the tubular mounting structure.

The present invention is based on the realization that the impedance transition at the lower end of the tubular mounting structure can be substantially removed while still enabling measurement inside the tubular mounting structure by providing a conductive shielding structure between the single conductor probe and the inner wall of the tubular mounting structure, where the shielding structure is configured in such a way that it is radially open to allow entry of the product and exhibits a total enclosing arc angle around said single conductor probe greater than 180° past the lower end of the nozzle. This will reduce the radial extension of the electric field around the single conductor probe inside the tubular mounting structure, while still allowing measurement of the filling level even inside the tubular mounting structure. To additionally achieve a sufficiently small impedance transition at the lower end of the shielding structure, the present inventors have realized that the radial opening of the shielding structure should increase below the lower end of the tubular mounting structure with increasing distance from the lower end of the tubular mounting structure. In other words, the total enclosing arc angle around the single conductor probe should decrease with increasing distance from the lower end of the mounting structure below the tubular mounting structure. This provides for a reduced signal loss due to reflection and thus to an increased measurement range.

When the enclosing arc angle is reduced with increasing distance from the lower end of the tubular mounting structure, the probe conductor-shielding structure arrangement will approach a two conductor transmission line probe, and there will be an abrupt impedance transition between this two conductor transmission line probe and the single conductor transmission line probe below the lower end of the shielding structure (from about 250Ω to about 370Ω)). However, this impedance transition has a known magnitude and occurs at a known position along the single conductor probe, which makes it feasible to handle effects of this impedance transition in software. That the remaining impedance transition will occur at a known position and have known properties is an important difference from an impedance transition at the lower end of the tubular mounting structure, since the dimensions of the tubular mounting structure typically vary from installation to installation, and may be difficult to reliably characterize and compensate for. Accordingly, a further important insight of the present inventors is that although a substantial impedance transition remains, the effects of that impedance transition is feasible to mitigate using software without unreasonable effort upon installation or operation of the radar level gauge system.

Hereby, the influence of the tubular mounting structure can be substantially removed while at the same time enabling the determination of filling levels closer to the top of the tank.

Furthermore, this can be achieved through the provision of a shielding structure that is relatively robust and reliable. The shielding structure according to embodiments of the present invention is also expected to be relatively easy to install, even as an addition to existing radar level gauge installations.

The more the impedance of the single conductor probe-shielding structure arrangement can be increased below the lower end of the tubular mounting structure, the smaller the impact of the impedance step at the lower end of the shielding structure will be, and the easier it will be to handle the remaining echo signals resulting from impedance step at the lower end of the shielding structure in software.

According to various embodiments of the present invention, the shielding structure may therefore by configured in such a way the total enclosing arc angle decreases from at least 180° to less than 20° in the second portion of the shielding structure. If the total enclosing arc angle is decreased to around 5-10°, the impedance at the lower end of the shielding structure will be rather close to the impedance of the single conductor probe in free space (below the lower end of the shielding structure). For instance, for a tubular shielding structure with an inner diameter of 32 mm, and a probe with a diameter of 4 mm, a total enclosing arc angle of about 7° will result in an impedance of about 350Ω, which is quite close to the free space propagation impedance of about 370Ω. Such a small impedance step can easily be compensated for using software.

Moreover, to ensure a smooth impedance transition from the impedance inside the tubular mounting structure to the impedance at the lower end of the shielding structure, in particular when the single conductor probe-shielding structure arrangement approaches a two conductor transmission line, the above-mentioned second portion of the shielding structure may advantageously extend along the single conductor probe at least a distance corresponding to a range resolution of the radar level gauge system. The range resolution of a radar level gauge system is inversely proportional to the bandwidth of the transmit signal, and is around 15 cm for a bandwidth of 1 GHz.

This will provide for a smooth impedance transition for propagation of the transmit signal through air as well as through oil (which can be assumed to have a relative dielectric constant of about 2.25), which will be of importance to provide for reliable measurements in cases when the shielding structure is at least partly submerged in the product (such as oil) in the tank.

To provide for the desired smooth impedance transition in the above-mentioned second portion of the shielding structure, the total enclosing arc angle around the single conductor probe may advantageously decrease continuously in the second portion. Such a configuration, in particular, can provide for a smooth impedance transition both when the shielding structure is at least partly covered by the product in the tank, and when the surface of the product is below the lower end of the shielding structure.

In embodiments, the total enclosing arc angle around the single conductor probe may decrease continuously from the lower end of the mounting structure to a lower end of the shielding structure.

To even further reduce the impedance step at the lower end of the shielding structure, the portion of the shielding structure closest to the lower end of the shielding structure may exhibit a gradually increasing radial distance from the single conductor probe. By, for instance, gradually increasing the distance from, say, 16 mm to, say, 50 mm, the impedance can be gradually increased to about 370Ω, whereby the impedance step at the lower end of the shielding structure is practically eliminated.

To sufficiently reduce the influence of the tubular mounting structure on the impedance experienced by the transmit signal inside the tubular mounting structure, the total enclosing arc angle around the single conductor probe may advantageously be greater than 180° in the first portion from the upper end of the mounting structure to the lower end of the mounting structure.

It may be advantageous to even further reduce the extension of the electric field inside the tubular mounting structure. To that end, the total enclosing arc angle around the single conductor probe may be greater than 270° in the first portion.

According to various embodiments, furthermore, the shielding structure may be substantially tubular, at least in the above-mentioned first portion. For instance, the shielding structure may be manufactured starting from a tube and removing material to make a longitudinal slit that widens in the second portion of the shielding structure as described above.

Alternatively, the shielding structure may be formed by bending a suitably shaped piece of sheet metal, or the shielding structure may be provided as a kind of angle trim.

To allow easy insertion into most existing tubular mounting structures (nozzles) on tanks, the maximum lateral dimension of the shielding structure may advantageously be less than 5 cm.

According to various embodiments of the present invention, the radar level gauge system may further comprise at least one dielectric spacer arranged between the single conductor probe and an inner surface of the shielding structure for preventing unwanted contact between the single conductor probe and the shielding structure. The at least one dielectric spacer may be attached to the single conductor probe, which may comprise a flexible wire, a substantially rigid rod, or a combination thereof. Moreover, the at least one spacer may be perforated or otherwise shaped to allow passage of product past the dielectric spacer.

Advantageously, the dielectric spacer may be configured to provide a first reflection and a second reflection that substantially cancel out each other to provide for a very small total reflection from the spacer.

For instance, the dielectric spacer may have an extension along the single conductor probe of about one half center wavelength of the transmit signal. Alternatively, the spacer may comprise a first spacer part and a second spacer part, which are spaced apart along the single conductor probe about one quarter center wavelength of the transmit signal. To further reduce the total reflection, the spacer may comprise further spacer parts, where each is spaced apart from adjacent spacer part(s) by about one quarter center wavelength of the transmit signal.

According to embodiments of the present invention, the radial distance between the single conductor probe and an inner surface of the shielding structure may be substantially constant along a length of the shielding structure. This may considerably facilitate installation of the radar level gauge system on site or adding a shielding structure to an existing installation. Moreover, the manufacturability of the shielding structure may be improved.

To reduce the first impedance step mentioned further above at the transition from the feed-through to the single conductor probe-shielding structure arrangement, the radar level gauge system according to embodiments of the present invention may further advantageously comprise an impedance matching arrangement provided between the shielding structure and the single conductor probe adjacent to the feed-through.

Hereby, a smooth impedance transition can be achieved between the impedance of the feed-through (such as about 50Ω) to the impedance of the single conductor probe-shielding structure arrangement (such as about 250Ω). This will reduce the occurrence of potentially disturbing multiple reflections and reduce signal loss, which in turn provides for an increased measurement range.

In embodiments of the present invention, the impedance matching arrangement may be structured such that a radial distance between the single conductor probe and the impedance matching arrangement increases with increasing distance along the probe from the feed-through.

As was mentioned further above, according to embodiments of the present invention, the impedance transition at the lower end of the shielding structure has a known magnitude and occurs at a known position along the single conductor probe, which makes it feasible to handle effects of this impedance transition in software.

Hence, the processing circuitry comprised in the radar level gauge system according to embodiments of the present invention may advantageously comprise signal processing circuitry for forming an echo signal based on the transmit signal and the reflection signal, and removing an echo resulting from reflection of the transmit signal at a lower end of the shielding structure.

Moreover, the radar level gauge system according to various embodiments of the present invention may advantageously be comprised in a tank arrangement, further comprising a tank having a tubular mounting structure extending substantially vertically upwards from a roof of the tank.

The tank contains a product to be gauged and the radar level gauge system is attached to the tubular mounting structure in such a way that the transceiver is arranged outside the tank, and the single conductor probe extends through the tubular mounting structure towards and into the product.

In summary, the present invention thus relates to a radar level gauge system comprising a single conductor probe extending through a tubular mounting structure towards and into the product in the tank, a shielding structure radially spaced apart from the single conductor probe and extending along a top portion of the probe inside the mounting structure and past the lower end of the mounting structure, and processing circuitry connected to the transceiver for determining the filling level of the product in the tank. The shielding structure at least partly encloses the top portion of the single conductor probe, and is open in a radial direction to allow entry of the product. The shielding structure exhibits a total enclosing arc angle around the single conductor probe greater than 180° inside the tubular mounting structure, and a total enclosing arc angle around the single conductor probe that decreases with increasing distance from the lower end of the mounting structure.

BRIEF DESCRIPTION OF THE DRAWINGS

These and other aspects of the present invention will now be described in more detail, with reference to the appended drawings showing a currently preferred embodiment of the invention, wherein:

FIG. 1b is a schematic illustration of the measurement electronics unit comprised in the radar level gauge system in FIG. 1a including a schematic feed-through;

FIGS. 5a-b schematically show a first alternative configuration of the single conductor probe-shielding structure arrangement in FIG. 2; and FIGS. 6a-b schematically show a second alternative configuration of the single conductor probe-shielding structure arrangement in FIG. 2.

DETAILED DESCRIPTION OF AN EXAMPLE EMBODIMENT OF THE INVENTION

Figure 1A:
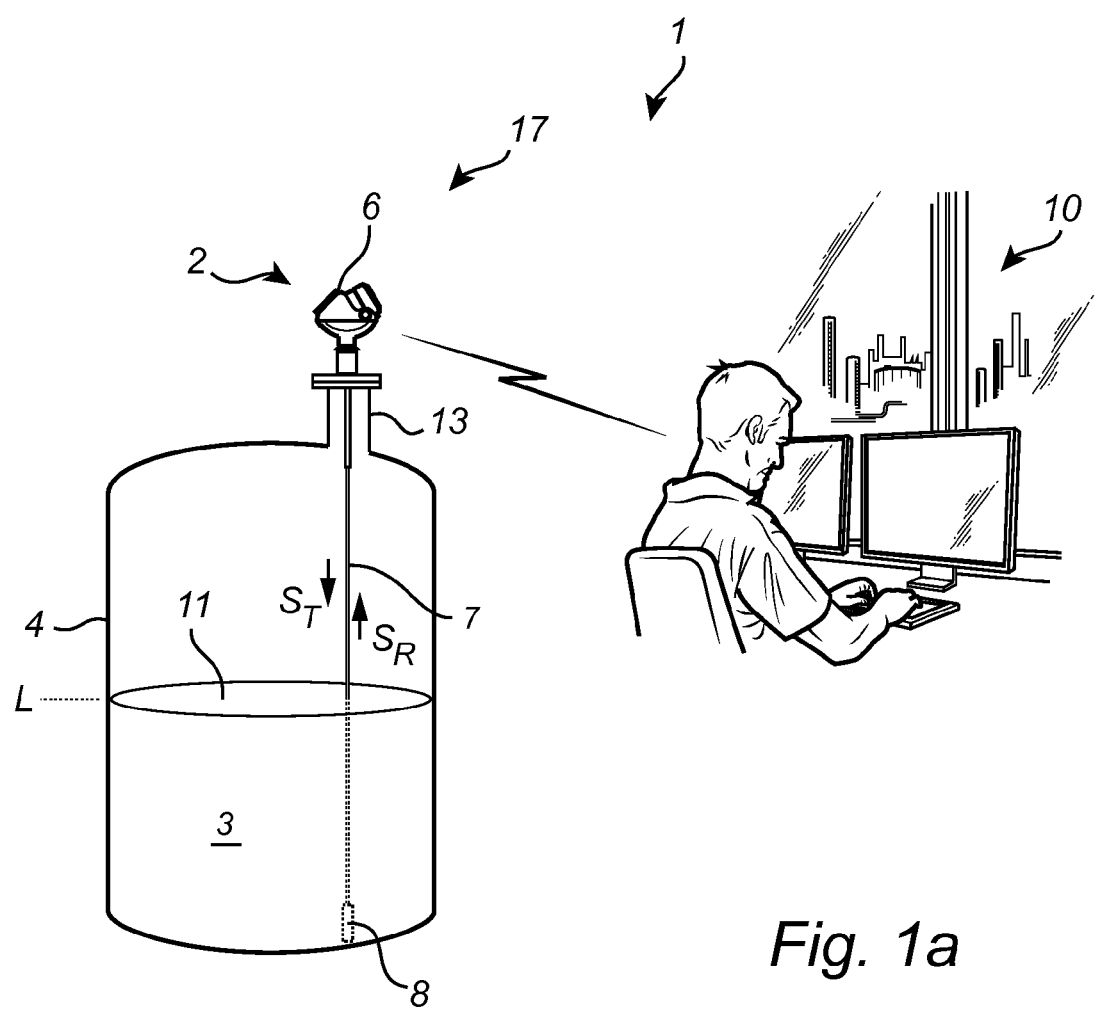
FIG. 1a schematically illustrates an exemplary tank arrangement comprising a radar level gauge system according to an embodiment of the present invention.

FIG. 1 schematically shows a level measuring system 1 comprising a tank arrangement 11 according to an example embodiment of the present invention, and a host system 10 illustrated as a control room.

The tank arrangement 11 comprises a radar level gauge 2 of GWR (Guided Wave Radar) type and a tank 4 having a tubular mounting structure 13 (often referred to as a "nozzle") extending substantially vertically from the roof of the tank 4.

The radar level gauge 2 is installed to measure the filling level of a product 3 contained in the tank 4. The radar level gauge 2 comprises a measuring unit 6 and a propagation device in the form of a single conductor probe 7 extending from the measuring unit 6, through the tubular mounting structure 13, towards and into the product 3. In the example embodiment in FIG. 1, the single conductor probe 7 is a wire probe, that has a weight 8 attached at the end thereof to keep the wire straight and vertical.

By analyzing transmitted signals $S_T$ being guided by the probe 7 towards the surface 11 of the product 3, and reflected signals $S_R$ traveling back from the surface 11, the measurement unit 6 can determine the distance between a reference position (such as a feed-through between the outside and the inside of the tank) and the surface 11 of the product 3, whereby the filling level can be deduced. It should be noted that, although a tank 4 containing a single product 3 is discussed herein, the distance to any material interface along the probe can be measured in a similar manner.

Figure 1B:
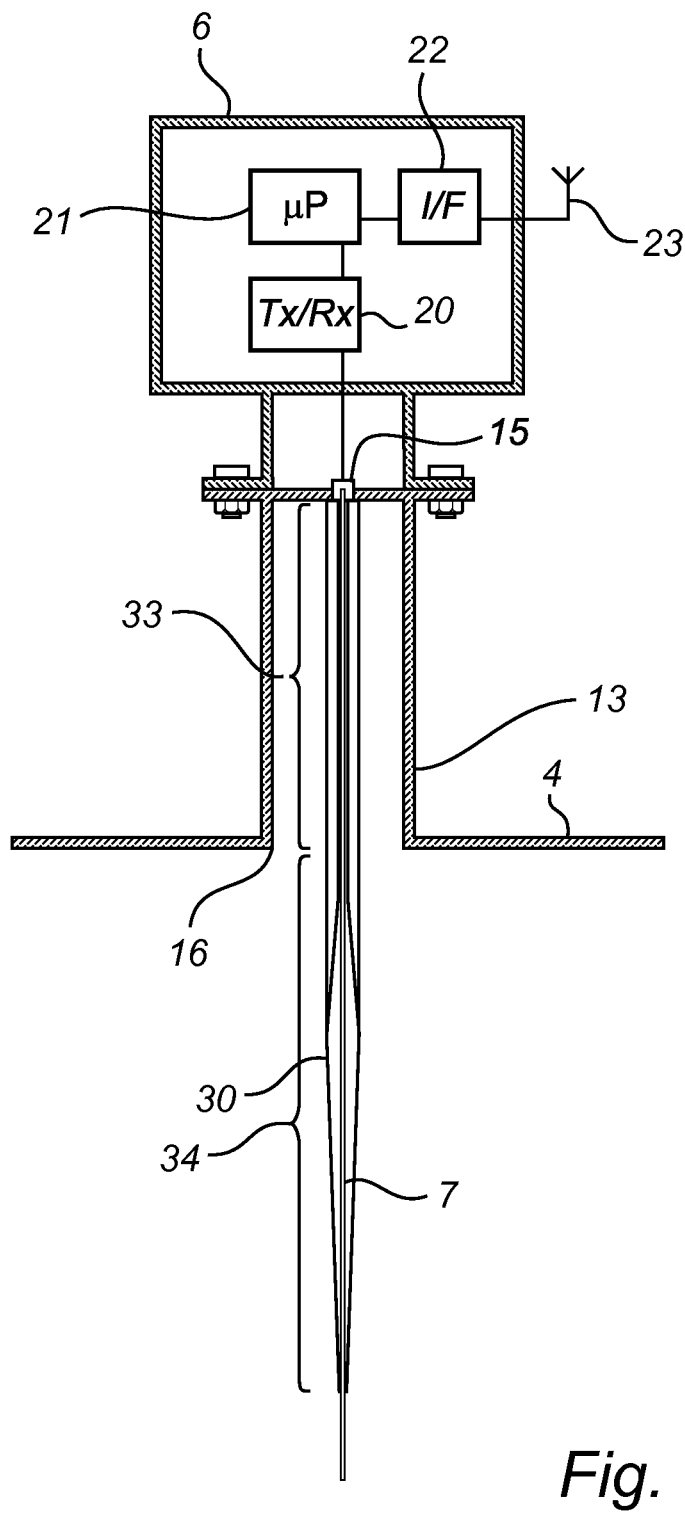

As is schematically illustrated in FIG. 1b, the measurement unit 6 comprises a transceiver 20, processing circuitry 21, a communication interface 22, and a communication antenna 23 for wireless communication with the control room 10.

The transceiver 20 is configured to generate, transmit and receive electromagnetic signals, the processing circuitry 21 is connected to the transceiver 20 and configured to determine the filling level L of the product 3 based on the transmit signal $S_T$ and the reflection signal $S_R$ being a reflection of the transmit signal at the surface 11 of the product 3. The communication interface 22 is connected to the processing circuitry 21 and configured to allow communicating with the host system 10 via the communication antenna 23. In the example embodiment of FIG. 1a-b, the communication between the radar level gauge 2 and the host system 10 is indicated as being wireless communication. Alternatively, communication may, for example, take place over an analog and/or digital wire-based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol.

Moreover, although not shown in FIG. 1b, the radar level gauge 2 is typically connectable to an external power source, or may be powered through communication lines.

Also schematically indicated in FIG. 1b is a conductive shielding structure 30 radially spaced apart from the single conductor probe 7 and extending along a top portion of the single conductor probe inside the tubular mounting structure 13, from the feed-through 15 at the upper end of the tubular mounting structure 13 and past the lower end 16 of the tubular mounting structure 13.

As is schematically illustrated in FIG. 1b, the shielding structure 30 at least partly encloses a top portion of the single conductor probe 7, and is open in the radial direction to allow measurement of filling levels higher than the lower end 31 of the shielding structure, such as inside the tubular mounting structure 13.

As will be described in greater detail further below with reference to FIG. 2, the shielding structure 30 comprises a first portion 33 extending along the single conductor probe 7 inside the tubular mounting structure 13, and a second portion 34 extending along the single conductor probe 7 below the lower end 16 of the tubular mounting structure 13.

In the first portion 33, the shielding structure 30 encloses the single conductor probe 7 to at least 50% (a total enclosing arc angle of at least) 180°, which substantially reduces the impedance step at the lower end 16 of the tubular mounting structure 13.

In the second portion 34, the shielding structure 30 encloses the single conductor probe 7 less and less with increasing distance from the lower end 16 of the tubular mounting structure 13. In other words, the total enclosing arc angle decreases. This provides for a smooth transition from the impedance inside the tubular mounting structure 13 to the impedance of a twin line transmission line at the lower end 31 of the shielding structure 30.

Figure 2:
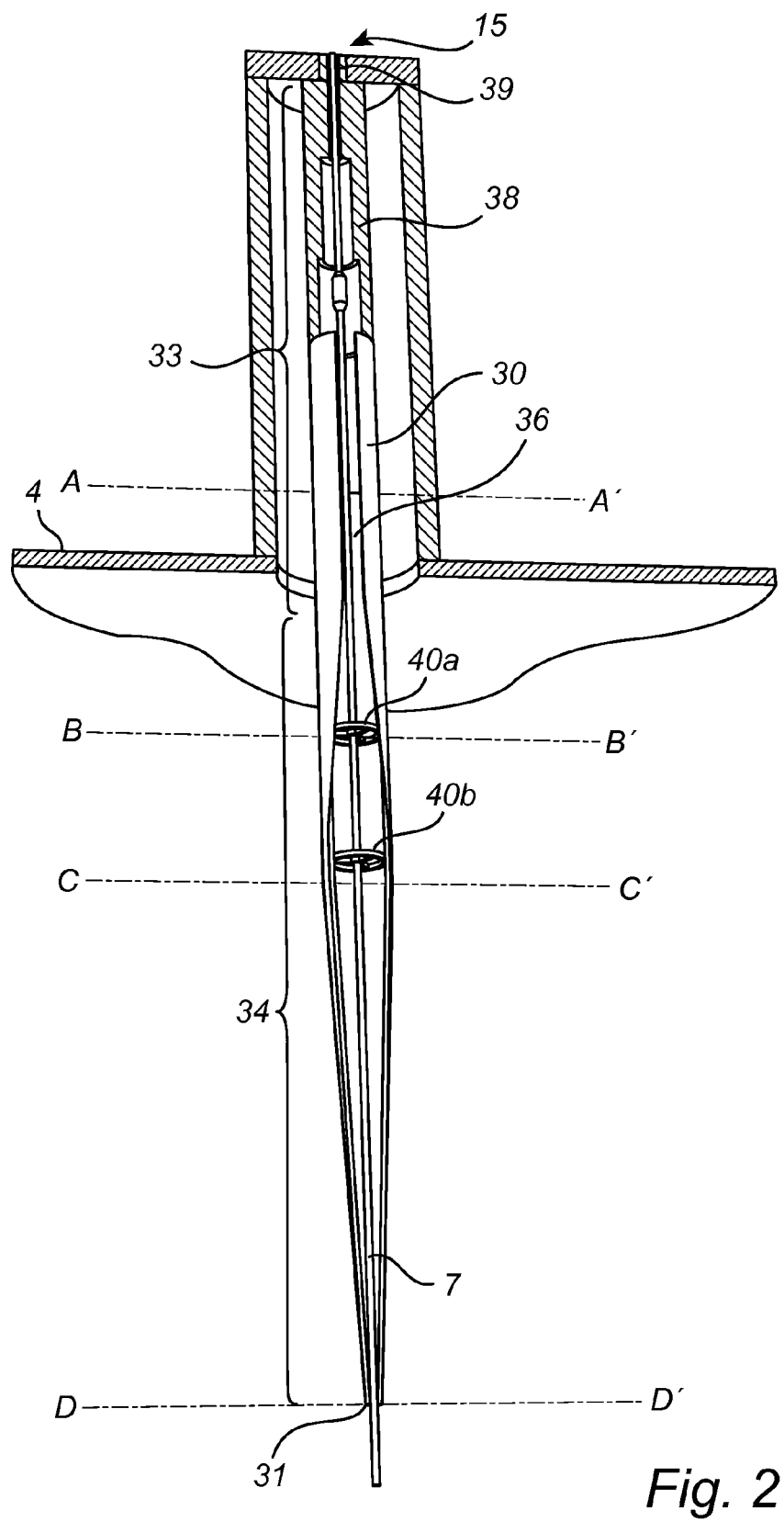
FIG. 2 is a schematic and partly opened side view of the top portion of the single conductor probe comprised in the radar level gauge system in FIG. 1b extending through the tubular mounting structure of the tank and being partly surrounded by a conductive shielding structure.

FIG. 2 is a schematic and partly opened side view of the top portion of the single conductor probe 7 comprised in the radar level gauge system in FIG. 1b extending through the tubular mounting structure 13 of the tank 4 and being partly surrounded by the conductive shielding structure 30.

In the example configuration of FIG. 2, the shielding structure 30 is provided as a steel tube having a substantially circular cross-section and having a slit 36 extending along the length of the shielding structure.

In the first portion 33 of the shielding structure 30, which extends through the tubular mounting structure 13 and optionally past the lower end 16 of the tubular mounting structure 13, the cross-section of the shielding structure, in a plane perpendicular to the probe 7, may be substantially constant.

In the second portion 34 of the shielding structure 30, which extends along the probe 7 below the lower end 16 of the tubular mounting structure 13, the slit 36 gradually becomes bigger with increasing distance from the lower end 16 of the tubular mounting structure 13. Depending on the actual configuration of the shielding structure 30, it may be advantageous to start to gradually decrease the total enclosing arc angle above, at or below the lower end 16 of the tubular mounting structure 13. An advantage of starting to gradually decrease the total enclosing arc angle above the lower end 16 of the tubular mounting structure 13 is that the total length of the shielding structure may be reduced.

The radar level gauge system 2 further comprises an impedance matching arrangement 38 arranged between the shielding structure 30 and the probe 7 adjacent to the feed through 15. The purpose of the impedance matching arrangement 38 in FIG. 2 is to achieve a smooth transition from the impedance of the feed-through (about 50Ω) to the impedance of the probe-shielding structure arrangement below the impedance matching arrangement 38 (about 140Ω). To that end, the impedance matching arrangement 38 may be conductive, for example metallic, and structured such that a radial distance between the probe 7 and the impedance matching arrangement 38 increases with increasing distance along the probe 7 from the feed-through 15. Increasing the distance between the probe 7 and the impedance matching arrangement 38 stepwise in three or more quarter wavelength steps is expected to provide a sufficiently smooth transition from the feed-through impedance to the probe-shielding structure arrangement impedance.

As is schematically indicated in FIG. 2, the impedance matching arrangement 38 may advantageously comprise an upper portion 39 for attachment of the impedance matching arrangement 38 at the feed-through 15.

To prevent the probe 7 from unwanted contact with the shielding structure 30, the probe 7 may be provided with at least one spacer 40*a-b*, which may, for instance, be made of PTFE or a suitable ceramic material. In FIG. 2, the spacer comprises first 40*a* and second 40*b* spacer parts that are spaced apart along the probe a distance corresponding to one quarter of a center wavelength of the transmit signal.

In order to achieve the desired smooth impedance transition in the second portion 34 of the shielding structure 30, the gradual decrease in the total enclosing arc angle (gradual increase in the width of the slit 36) may advantageously take place along a distance at least corresponding to the range resolution of the radar level gauge system 2.

As is well known to one of ordinary skill in the art, the range resolution is inversely proportional to the bandwidth of the transmit signal. For a bandwidth of 1 GHz, the range resolution is about 15-20 cm. Accordingly, the gradual decrease in the total enclosing arc angle should then preferably take place along a distance of at least 15-20 cm.

In FIG. 2, which is approximately drawn to scale for an example embodiment, the diameter of the probe 7 is about 4 mm, and the outer diameter of the shielding structure 30 is about 40 mm. In other embodiments, the outer diameter of the shielding structure 30 may be smaller, such as less than around 25.4 mm (1 inch) to allow insertion into practically all existing mounting holes of storage or process tanks.

Exemplary cross-sections of the shielding structure 30 at the different positions A-D along the probe schematically indicated in FIG. 2, will now be described with reference to FIGS. 3*a-d*.

Figure 3A:
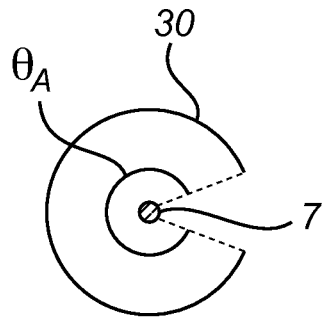
FIGS. 3a-d are schematic cross-section views at different positions along the single conductor probe of the single conductor probe-shielding structure arrangement in FIG. 2.

FIG. 3*a* schematically shows a cross-section of the probe-shielding structure arrangement in FIG. 2 along the line A-A' in a plane perpendicular to the extension of the probe 7. As is schematically indicated in FIG. 3*a*, the total enclosing arc angle $\Theta_A$ is about 300°, which results in an impedance of about 140Ω.

As was described above with reference to FIG. 2, the impedance matching arrangement 38 provides a smooth impedance transition from about 50Ω in the feed-through 15 to about 140Ω inside the tubular mounting structure 13.

In the second portion 34 of the shielding structure 30, the total enclosing arc angle continuously decreases from about 300° to about 10° or less.

Figure 3B:
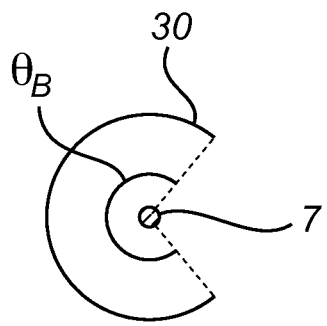

FIG. 3*b* schematically shows a cross-section of the probe-shielding structure arrangement in FIG. 2 along the line B-B' in a plane perpendicular to the extension of the probe 7. As is schematically indicated in FIG. 3*b*, the total enclosing arc angle $\Theta_B$ is about 250°, which results in an impedance of about 150Ω.

Figure 3C:
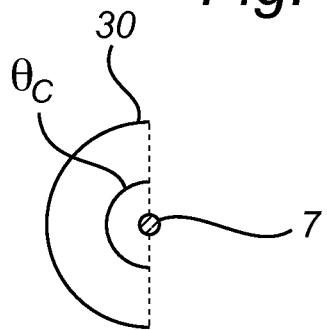

FIG. 3*c* schematically shows a cross-section of the probe-shielding structure arrangement in FIG. 2 along the line C-C' in a plane perpendicular to the extension of the probe 7. As is schematically indicated in FIG. 3*c*, the total enclosing arc angle $\Theta_C$ is about 180°, which results in an impedance of about 160Ω.

Figure 3D:
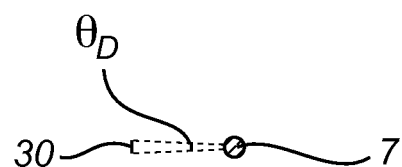

FIG. 3*d* schematically shows a cross-section of the probe-shielding structure arrangement in FIG. 2 along the line D-D' in a plane perpendicular to the extension of the probe 7. As is schematically indicated in FIG. 3*d*, the total enclosing arc angle $\Theta_D$ is about 10°, which results in an impedance of about 350Ω.

As was mentioned further above, there will be a remaining impedance step at the lower end 31 of the shielding structure 30. Since the impedance of the single conductor probe 7 in free space (below the lower end 31 of the shielding structure 30) is about 370Ω, this impedance step will result in a mismatch reflection, which may be in the same order of magnitude as a typical oil echo.

However, since the magnitude and position of the mismatch echo at the lower end 31 of the shielding structure 30 is well known by the provider of the radar level gauge system and largely independent of the particular installation, the mismatch echo can be removed from the echo curve using software.

Figure 4A:
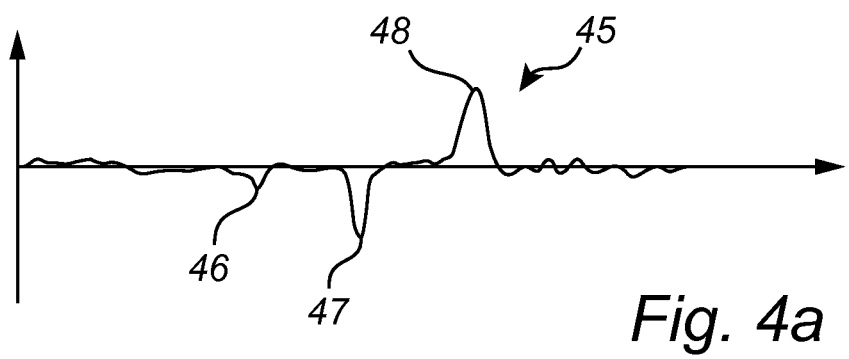
FIG. 4a schematically illustrates an exemplary echo profile obtained using the radar level gauge system in FIG. 2 without correction for the impedance step at the lower end of the shielding structure.
Figure 4B:
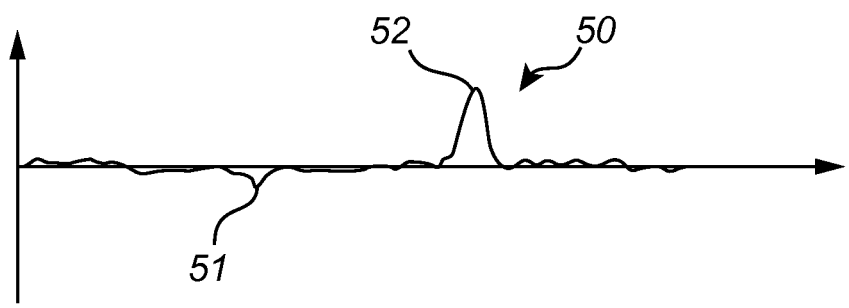
FIG. 4b schematically illustrates an exemplary echo profile obtained using the radar level gauge system in FIG. 2 with correction for the impedance step at the lower end of the shielding structure.

This is schematically shown in FIGS. 4*a-b*, which are exemplary illustrations of echo curves without (FIG. 4*a*) and with (FIG. 4*b*) removal in software of the echo resulting from reflection of the transmit signal at the impedance step at the lower end 31 of the shielding structure 30.

Referring first to FIG. 4*a*, the echo curve 45 comprises a first echo 46 resulting from a small remaining impedance step at the lower end 16 of the tubular mounting structure 13, a second echo 47 resulting from the above-mentioned impedance step at the lower end 31 of the shielding structure 30, and a third echo 48 resulting from reflection at the surface 11 of the product 3 in the tank 4. It is obvious from FIG. 4*a*, that the second echo 47 may make it difficult to accurately determining the filling level in cases when the surface 11 of the product 3 is close to the lower end 31 of the shielding structure.

Turning now to FIG. 4*b*, the modified echo curve 50 comprises a first echo 51 at the same position as the first echo 46 of the original echo curve 45 in FIG. 4*a*, and a surface echo 52 corresponding to the surface echo 48 in FIG. 4*a*. In the modified echo curve 50, there is, however, substantially no echo at the position along the probe 7 corresponding to the lower end 31 of the shielding structure 30.

So far, the radar level gauge system and tank arrangement according to embodiments of the present invention have been described with reference to a shielding structure in the form of a pipe having a longitudinally extending slit that widens with increasing distance from the lower end 16 of the tubular mounting structure 13.

It should be noted that several alternative configurations of the shielding structure are feasible. Two such alternative configurations are schematically shown in FIGS. 5*a-b*, and FIGS. 6*a-b*.

Referring first to FIGS. 5*a-b*, the shielding structure 30 is provided in the form of a conductive structure with first 55 and second 56 longitudinally extending substantially planar surfaces forming an angle with respect to each other—a kind of angle trim. In the exemplary embodiment of FIGS. 5*a-b*, the angle between the first 55 and second 56 surfaces is about 90°, and the probe 7 is arranged such that the total enclosing arc angle Θ is about 250°.

Turning to FIGS. 6a-b, the shielding structure 30 is provided in the form of a conductive pipe, which is perforated by holes 58a-b (only one hole is indicated by a reference numeral in FIG. 6a) in the first portion 33 of the shielding structure 30 and is opened up from the side with an expanding slit in the second portion 34 of the shielding structure 30.

As is schematically shown in FIG. 6b, the total enclosing arc angle $\Theta_{tot}$ will here be the sum of the first enclosing arc angle $\Theta_1$ and the second enclosing arc angle $\Theta_2$ at the positions of the perforating holes 58a-b.

The person skilled in the art realizes that the present invention by no means is limited to the preferred embodiments described above. On the contrary, many modifications and variations are possible within the scope of the appended claims. Furthermore, it should be understood that various embodiments of the present invention are not limited to the use of a particular radar level gauging technology, such as using a pulsed transmit signal or not.

What is claimed is:

1. A radar level gauge system for determining a filling level of a product in a tank having a tubular mounting structure extending substantially vertically upwards from a roof of said tank, said radar level gauge system comprising:
    a transceiver arranged outside said tank for generating, transmitting and receiving electromagnetic signals;
    a single conductor probe arranged inside said tank and electrically connected to said transceiver via a feed-through arranged at an upper end of said mounting structure, said single conductor probe extending substantially vertically through said mounting structure past a lower end of said mounting structure towards and into the product in the tank for guiding an electromagnetic transmit signal from said transceiver through a tank atmosphere towards a surface of the product, and for returning an electromagnetic surface reflection signal resulting from reflection of said transmit signal at said surface back towards said transceiver;
    an electrically conductive shielding structure radially spaced apart from said single conductor probe and extending along a top portion of said single conductor probe inside said mounting structure and past the lower end of said mounting structure; and
    processing circuitry connected to said transceiver for determining said filling level based on said transmit signal and said surface reflection signal,
    wherein said shielding structure at least partly encloses the top portion of said single conductor probe, and is open in a radial direction to allow entry of said product, thereby enabling measurement of filling levels corresponding to the top portion of the probe,
    said shielding structure comprising a first portion extending along said single conductor probe inside the mounting structure, and a second portion extending along said single conductor probe below the lower end of the mounting structure,
    wherein the shielding structure exhibits, in a cross-section perpendicular to an extension of said single conductor probe:
    a total enclosing arc angle around said single conductor probe greater than 180° in said first portion; and
    a total enclosing arc angle around said single conductor probe that decreases with increasing distance from the lower end of the mounting structure in said second portion.

2. The radar level gauge system according to claim 1, wherein said total enclosing arc angle decreases from at least 180° to less than 20° in said second portion.

3. The radar level gauge system according to claim 2, wherein said second portion extends along said single conductor probe at least a distance corresponding to a range resolution of said radar level gauge system.

4. The radar level gauge system according to claim 1, wherein said total enclosing arc angle around said single conductor probe decreases continuously in said second portion.

5. The radar level gauge system according to claim 4, wherein said total enclosing arc angle around said single conductor probe decreases continuously from the lower end of the mounting structure to a lower end of the shielding structure.

6. The radar level gauge system according to claim 1, wherein said total enclosing arc angle around said single conductor probe is greater than 180° in said first portion from the upper end of the mounting structure to the lower end of the mounting structure.

7. The radar level gauge system according to claim 1, wherein said total enclosing arc angle around said single conductor probe is greater than 270° in said first portion.

8. The radar level gauge system according to claim 1, wherein said shielding structure is substantially tubular, at least in said first portion.

9. The radar level gauge system according to claim 8, wherein said shielding structure comprises a longitudinally extending slit exhibiting an increasing opening in said second portion.

10. The radar level gauge system according to claim 1, wherein a maximum lateral dimension of said shielding structure is less than 5 cm.

11. The radar level gauge system according to claim 1, wherein said radar level gauge system further comprises at least one spacer arranged between said single conductor probe and an inner surface of said shielding structure for preventing unwanted contact between said single conductor probe and said shielding structure.

12. The radar level gauge system according to claim 1, wherein a radial distance between said single conductor probe and an inner surface of said shielding structure is substantially constant along a length of said shielding structure.

13. The radar level gauge system according to claim 1, wherein said radar level gauge system further comprises an impedance matching arrangement provided between said shielding structure and said single conductor probe adjacent to said feed-through.

14. The radar level gauge system according to claim 13, wherein said impedance matching arrangement is structured such that a radial distance between said single conductor probe and said impedance matching arrangement increases with increasing distance along the probe from said feed-through.

15. The radar level gauge system according to claim 14, wherein said radial distance increases step-wise, a length along said single conductor probe of each step exhibiting a substantially constant radial distance between the single conductor probe and the impedance matching arrangement at least approximately corresponding to a quarter of a center wavelength of the transmit signal.

16. The radar level gauge system according to claim 14, wherein said impedance matching arrangement comprises an electrically conductive member arranged in abutment with an inner surface of said shielding structure.

17. The radar level gauge system according to claim 1, wherein said processing circuitry comprises signal processing circuitry for forming an echo signal based on said transmit signal and said reflection signal, and removing an echo resulting from reflection of the transmit signal at a lower end of the shielding structure.

18. A tank arrangement comprising:
a tank having a tubular mounting structure extending substantially vertically upwards from a roof of said tank, said tank containing a product to be gauged; and
the radar level gauge according to claim 1 attached to said tubular mounting structure.

19. A tank arrangement comprising:
a tank having a tubular mounting structure extending substantially vertically upwards from a roof of said tank, said tank containing a product to be gauged; and
a radar level gauge system for determining a filling level of the product contained in said tank, said radar level gauge system comprising:
a transceiver arranged outside said tank for generating, transmitting and receiving electromagnetic signals;
a single conductor probe arranged inside said tank and electrically connected to said transceiver via a feed-through arranged at an upper end of said mounting structure, said single conductor probe extending substantially vertically through said mounting structure past a lower end of said mounting structure towards and into the product in the tank for guiding an electromagnetic transmit signal from said transceiver through a tank atmosphere towards a surface of the product, and for returning an electromagnetic surface reflection signal resulting from reflection of said transmit signal at said surface back towards said transceiver;
an electrically conductive shielding structure radially spaced apart from said single conductor probe and extending along a top portion of said single conductor probe inside said mounting structure and past the lower end of said mounting structure; and
processing circuitry connected to said transceiver for determining said filling level based on said transmit signal and said surface reflection signal,
wherein said shielding structure at least partly encloses the top portion of said single conductor probe, and is open in a radial direction to allow entry of said product, thereby enabling measurement of filling levels corresponding to the top portion of the probe,
said shielding structure comprising a first portion extending along said single conductor probe inside the mounting structure, and a second portion extending along said single conductor probe below the lower end of the mounting structure,
wherein the shielding structure exhibits, in a cross-section perpendicular to an extension of said single conductor probe:
a total enclosing arc angle around said single conductor probe greater than 180° in said first portion; and
a total enclosing arc angle around said single conductor probe that decreases with increasing distance from the lower end of the mounting structure in said second portion.

* * * * *